(12) United States Patent
Galle, Jr. et al.

(10) Patent No.: US 6,755,447 B2
(45) Date of Patent: Jun. 29, 2004

(54) PRODUCTION RISER CONNECTOR

(75) Inventors: Edward M. Galle, Jr., Kingwood, TX (US); Edward M. Galle, Sr., Friendswood, TX (US)

(73) Assignee: The Technologies Alliance, Inc., Houston, TX (US)

( * ) Notice: Subject to any disclaimer, the term of this patent is extended or adjusted under 35 U.S.C. 154(b) by 0 days.

(21) Appl. No.: 10/223,503

(22) Filed: Aug. 19, 2002

(65) Prior Publication Data

US 2003/0038476 A1 Feb. 27, 2003

Related U.S. Application Data

(60) Provisional application No. 60/314,766, filed on Aug. 24, 2001.

(51) Int. Cl.[7] .............................................. F16L 15/00
(52) U.S. Cl. ......................... 285/390; 285/355; 285/92
(58) Field of Search ................................ 285/333, 334, 285/390, 355, 92, 383, 148.6

(56) References Cited

U.S. PATENT DOCUMENTS

| | | | | | |
|---|---|---|---|---|---|
| 1,999,706 | A | * | 4/1935 | Spang | 285/333 |
| 2,181,343 | A | * | 11/1939 | Reimschissel | 285/390 |
| 2,308,066 | A | * | 1/1943 | Evans | 285/333 |
| 3,150,889 | A | * | 9/1964 | Watts | 285/334 |
| 4,537,429 | A | | 8/1985 | Landriault | |
| 4,595,219 | A | * | 6/1986 | Lenze et al. | 285/333 |
| 4,624,488 | A | | 11/1986 | Furgerson | |
| 4,629,224 | A | | 12/1986 | Landriault | |
| 5,060,740 | A | * | 10/1991 | Yousef et al. | 285/334 |
| 6,237,967 | B1 | * | 5/2001 | Yamamoto et al. | 285/333 |
| 6,557,906 | B1 | * | 5/2003 | Carcagno | 285/333 |

* cited by examiner

Primary Examiner—Lynne H. Browne
Assistant Examiner—Aaron Dunwoody
(74) Attorney, Agent, or Firm—Bracewell & Patterson, L.L.P.

(57) ABSTRACT

A pipe connector has a rigid seal/support ring mounted on its pin. The pin has a nose and external threads extending rearward from the nose. The rigid seal/support ring is fixedly mounted on an exterior portion of the pin farther from the pin nose than the pin threads. The rigid seal/support ring is installed by a shrink- or press-fit and has a tapered exterior seal surface. The box has a rim and internal threads that mate with the external pin threads. The box has a seal surface for engaging the seal surface of the rigid seal/support ring to form an external seal. The box also has a seal surface to form an internal seal with the nose of the pin.

21 Claims, 4 Drawing Sheets

PRODUCTION RISER CONNECTOR

This application claims the provisional application S. No. 60/314,766, filed Aug. 24, 2001.

FIELD OF THE INVENTION

This invention relates in general to pipe connectors, and particularly to a threaded connector having a separate rigid external seal/support ring affixed to the connector pin for engaging the box.

BACKGROUND OF THE INVENTION

One method of offshore oil and gas production utilizes a production riser extending upward from a subsea wellhead. The production riser is made up of sections of pipe, typically connected together with threaded connectors. The riser is subject to large tension loads and also to bending moments from currents and waves that the connectors must withstand over long periods of time. The connectors also must seal the internal pressure of the produced fluids and the external pressure of the seawater.

There are two major types of threaded connections used for production risers. In one type, the so-called "welded" type, the pin and box are machined separately from heavy-wall material and then welded to the pipe. In the other type, the so-called "threaded-and-coupled" type, the pin is typically machined directly onto the pipe ends. The box is machined into each end of a coupling that is used to join the pipe ends together.

In both types of connections, a primary internal metal-to-metal seal is formed between a nose of the pin and a mating surface within the box. It is also important to prevent the entry of seawater into the threads using an external seal, preferably a metal-to-metal seal. An external metal-to-metal seal also helps to withstand bending loads.

An external seal is readily accomplished in a welded connection using a metal-to-metal seal located at the opposite end of the threads to prevent the entry of seawater into the threads. The external seal usually requires a tapered surface to be formed on the exterior of the pin and in the interior of the box, thus reducing the metal thickness of the connector in these areas. This connector will have a larger outer diameter than the pipe to accomplish the desired sealing without reducing the ability to withstand stress and fatigue.

In a threaded-and-coupled connection, it is impossible to incorporate an external metal-to-metal seal machined directly onto the pipe without substantially reducing the ability to withstand stress and fatigue. Adhesives and sealants have been used in the past to seal the threads; however, there are disadvantages to this technique. Forging upset pin and box ends to increase the wall thickness available for an external metal-to-metal seal is also known, but is costly.

SUMMARY

The threaded-and-coupled riser connector of this invention utilizes a pin that has a separate rigid seal/support ring that is mounted onto the pin to create an external metal-to-metal seal and support for bending loads without substantially reducing the wall thickness of the pipe. The rigid seal/support ring has a seal surface that mates with a seal surface formed in the box. Preferably the rigid seal/support ring is of a different material and is selected to have a lower modulus of elasticity than the pin.

The pin is machined directly on both ends of a pipe. The box is formed in a coupling that secures to the pin. The coupling has two box-threaded sections for connecting between two riser pipes. In the preferred embodiment the rigid seal/support ring is of metal and is installed on the pin end by a shrink- or press-fit. Then, a tapered seal surface is machined on the exterior of the rigid seal/support ring.

The threads are preferably of a buttress type, having a stabbing flank, a load flank and a crest. The root has an elliptically formed junction with the load flank.

DETAILED DESCRIPTION OF THE INVENTION

Figure 1:
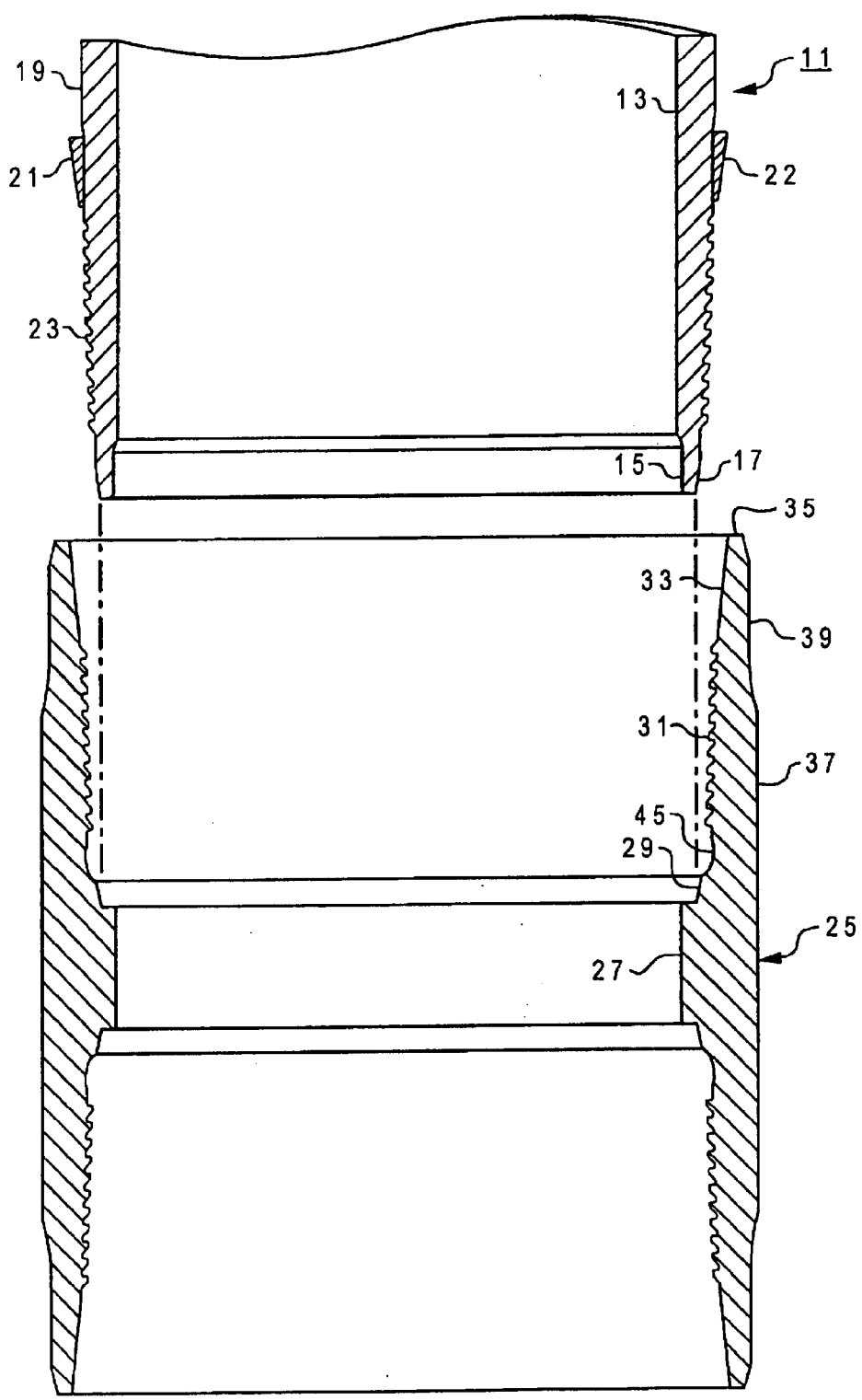
FIG. 1 is a sectional exploded view illustrating a connector constructed in accordance with this invention.

Referring to FIG. 1, one end of a pipe 11 is shown. Pipe 11 has identical ends in the preferred embodiment, each of which is machined on pipe 11 rather than being welded to pipe 11. Pipe 11 is preferably used as a production riser for offshore oil and gas production.

Pipe 11 has an axial bore 13 that is uniform in diameter, except at the extreme ends, where a recess or counterbore 15 is formed. Recess 15 is annular and may have a larger diameter than the remaining portion of bore 13. A nose 17 is machined on pipe 11 at recess 15. Nose 17 is a section that is thinner than the remaining portion of pipe 11 and is configured for forming a metal-to-seal seal on its exterior.

Pipe 11 has an outer diameter 19 that is substantially uniform throughout its length. A rigid seal/support ring 21 is mounted on the outer diameter 19 a selected distance rearward from nose 17. Seal/support ring 21 is preferably installed by a shrink- or press-fit procedure onto an outer diameter portion of pipe exterior 19 so that it is immovable and firmly fixed relative to pipe 11. The outer or seal surface 22 of seal/support ring 21 is preferably tapered or conical, with the smaller end located closer to nose 17 on the nearest end.

Pipe 11 is preferably a conventional steel pipe, while seal/support ring 21 is preferably of a metal having a lower modulus of elasticity than pipe 11. Pipe 11 may be coated or clad with a material such as aluminum to resist corrosion. Seal/support ring 21 is preferably formed of a corrosion-compatible material that may be steel, titanium, aluminum, other metals, and even nonmetallic materials. Depending upon the type of material, there will be a different radial interference between pipe outer diameter 19 and the inner diameter of seal/support ring 21. That is, the inner diameter of seal/support ring 21 is initially smaller than the initial outer diameter of the place on pipe 11 where it is mounted. There should be enough interference to create the forces necessary to retain seal/support ring 21 in position during stabbing and makeup.

One manner of installing seal/support ring 21 is to form a ring of rectangular cross-section, heat the ring to increase its inner diameter, and then slide it into position on the pipe exterior 19 while it is hot. As ring 21 cools, it will shrink to form the interference fit. The tapered surface 22 is preferably machined after it has cooled.

Another manner of installing seal/support ring 21 is to form a ring of rectangular cross-section and press it into position on the pipe exterior 19. The tapered surface 22 is preferably machined after the ring is pressed into position.

Figure 4:
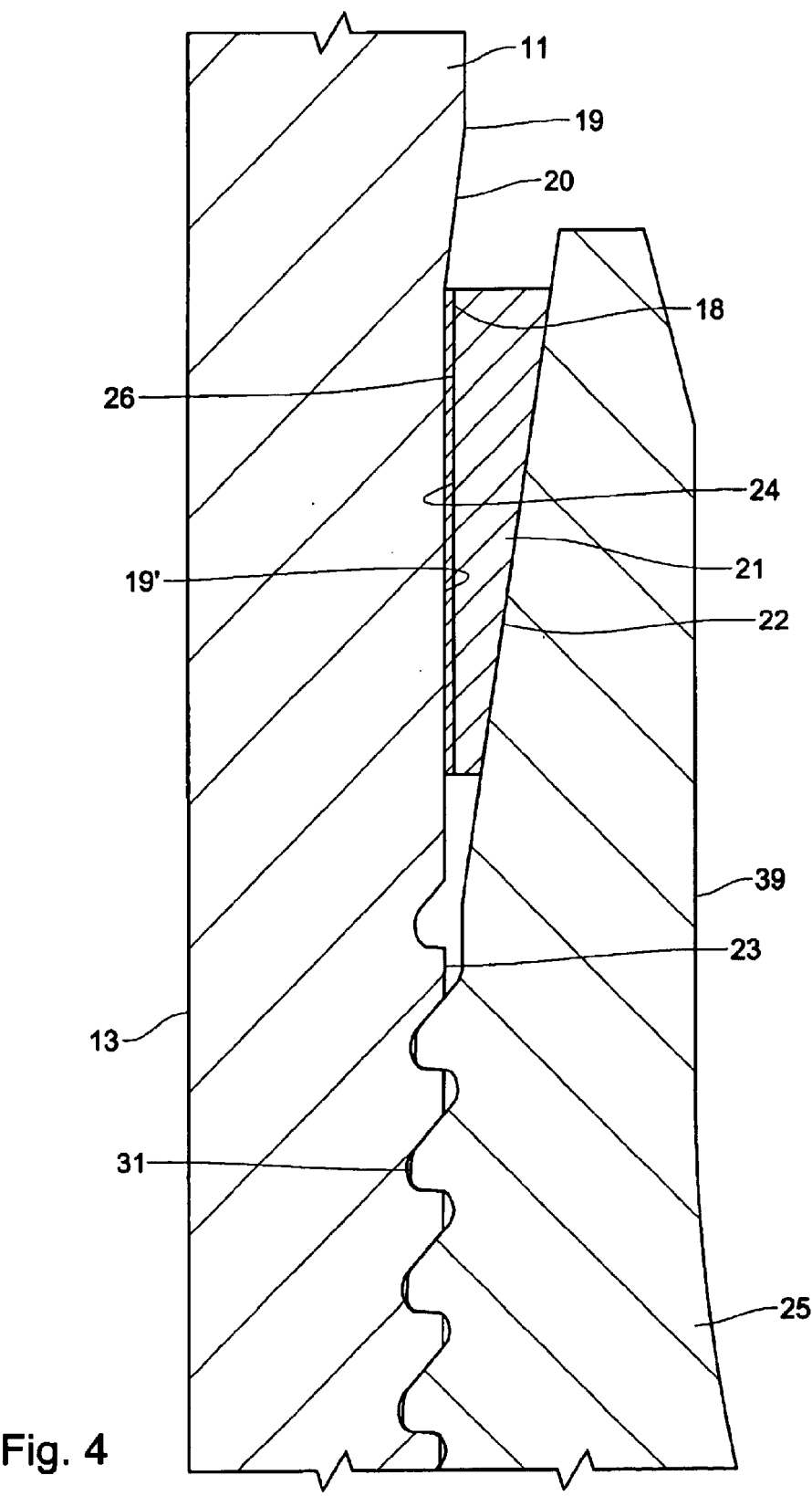
FIG. 4 is an enlarged view of the connector as shown in FIG. 2a, with a layer of adhesive shown greatly exaggerated.

When the seal/support ring 21 is shrunk-fit directly on the existing pipe surface 19, the portion of pipe surface 19 underlying seal/support ring 21 may have a micro-knurled, micro-cut, or roughened surface 24 (FIG. 4) to insure that it is retained in position during connection makeup. A roughened surface may be formed, for example, by shot-peening, which may also improve the fatigue life of the pipe in this critical area.

An adhesive material 26 (FIG. 4) may also be placed between pipe surface 19 and inner diameter of seal/support ring 21 to enhance the retention of ring 21 on pipe 11.

Figure 2A:
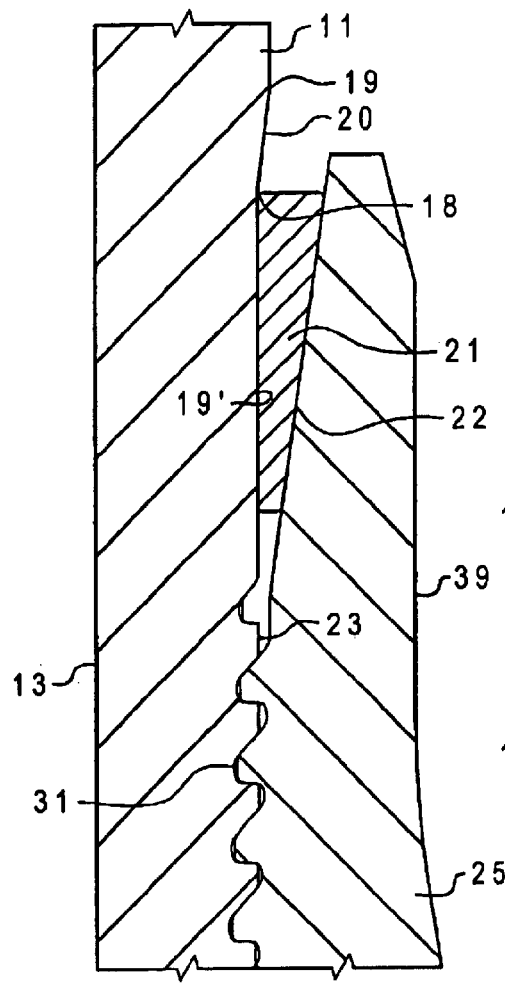
FIGS. 2a and 2b are partial sectional views of the connector of FIG. 1, shown made up.

Another method of insuring that seal/support ring 21 is retained in its axial position during stabbing and makeup is to machine a slightly smaller diameter cylindrical surface 19' on pipe 11 onto which seal/support ring 21 is to be shrunk or pressed, as shown in FIG. 2a. A small step or shoulder 18 is machined at the rearward end of reduced diameter section 19'. A small angle conical section 20 extends from step 18 to the full diameter exterior to blend with original pipe surface 19. Seal/support ring 21 abuts step 18 when it is installed. Step 18 helps to prevent any rearward movement of seal/support ring 21 during connection make-up.

Pin threads 23 are formed on pipe exterior 19 between nose 17 and seal/support ring 21. Threads 23 may be formed on pipe 11 either before or after the installation of seal/support ring 21. Threads 23 may be of a variety of types. In the preferred embodiment, threads 23 are of a buttress type, but have unique features, which will be described subsequently. A coupling 25 connects the ends of two pipes 11 together. Coupling 25 has a central bore area 27 that has the same diameter as recess 15 in bore 13. A nose seal area 29 is formed in the coupling bore adjacent central bore area 27. Box threads 31 are formed on each side of central bore portion 27. Threads 31 are identical to threads 23 of pipe 11.

A seal area 33 is located adjacent each rim 35 in the bore of coupling 25. Seal area 33 is a conical surface that is configured to seal against outer surface 22 of seal/support ring 21. The taper of seal area 33 and seal/support ring 21 could range from 5° to 15° but it is preferably 7° relative to the longitudinal axis of pipe 11.

There is also a radial interference between external seal/support ring surface 22 and internal surface 33. The amount of interference will differ depending on the particular pipe size, as well as the material of seal/support ring 21 and the wall thickness of pipe 11 and coupling 25. The interference is selected to maintain the proper contact stresses between seal external surface 22 and coupling internal surface 33 in order to affect a reliable dynamic metal-to-metal seal and bending support.

Coupling 25 has an outer diameter with a central portion 37 and reduced diameter portions 39 located adjacent each rim 35. The maximum outer diameter and the maximum wall thickness are located in the central portion 37, while the outer diameters at recesses 39 are smaller. This results in a thinner cross-section of the coupling wall at each end portion over the external seal surface 22. As shown in FIG. 1, the axial length of recess 39 is greater than an axial length of ring seal area 33.

Figure 2B:
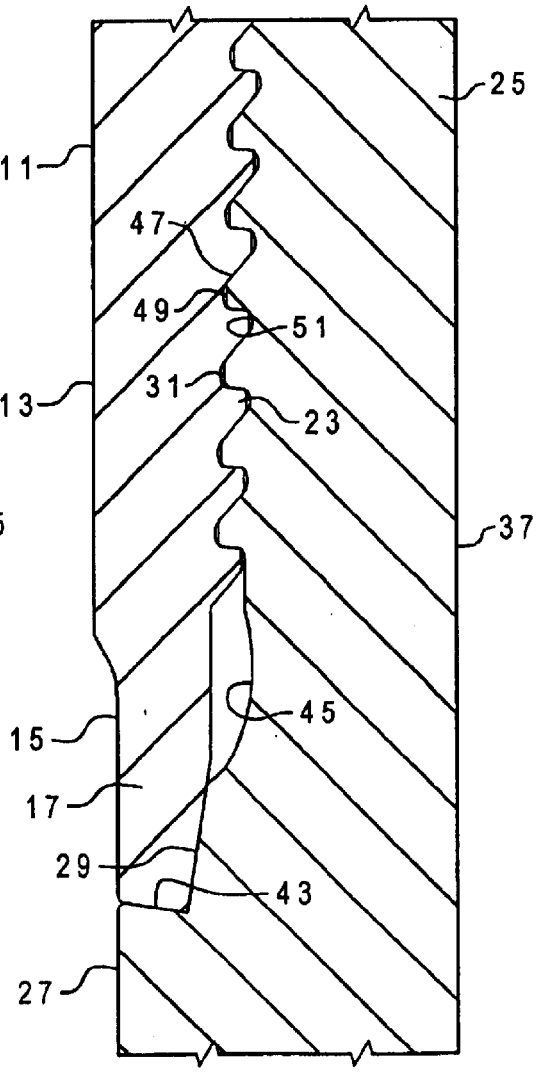

Referring to FIGS. 2a and 2b, a portion of one end of pipe 11 is shown in engagement with one end of coupling 25. Nose 17 has an end that abuts a shoulder 43 formed in the bore of coupling 25. Shoulder 43 is a conical surface, providing a taper that is at an acute angle relative to a plane perpendicular to the longitudinal axis. The outer periphery of shoulder 43 is farther from rim 35 than the portion of shoulder 43 that intersects bore central portion 27. The exterior of nose 17 is conical for mating with the interior of nose seal area 29. The exterior of nose 17 and internal seal surface 29 have radial interference for forming a metal-to-metal seal. This inner seal thus provides protection for threads 23, 31 from fluids contained in the interior of pipe 11. A stress relief groove 45 is located between the base of threads 31 and nose seal area 29.

Figure 3:
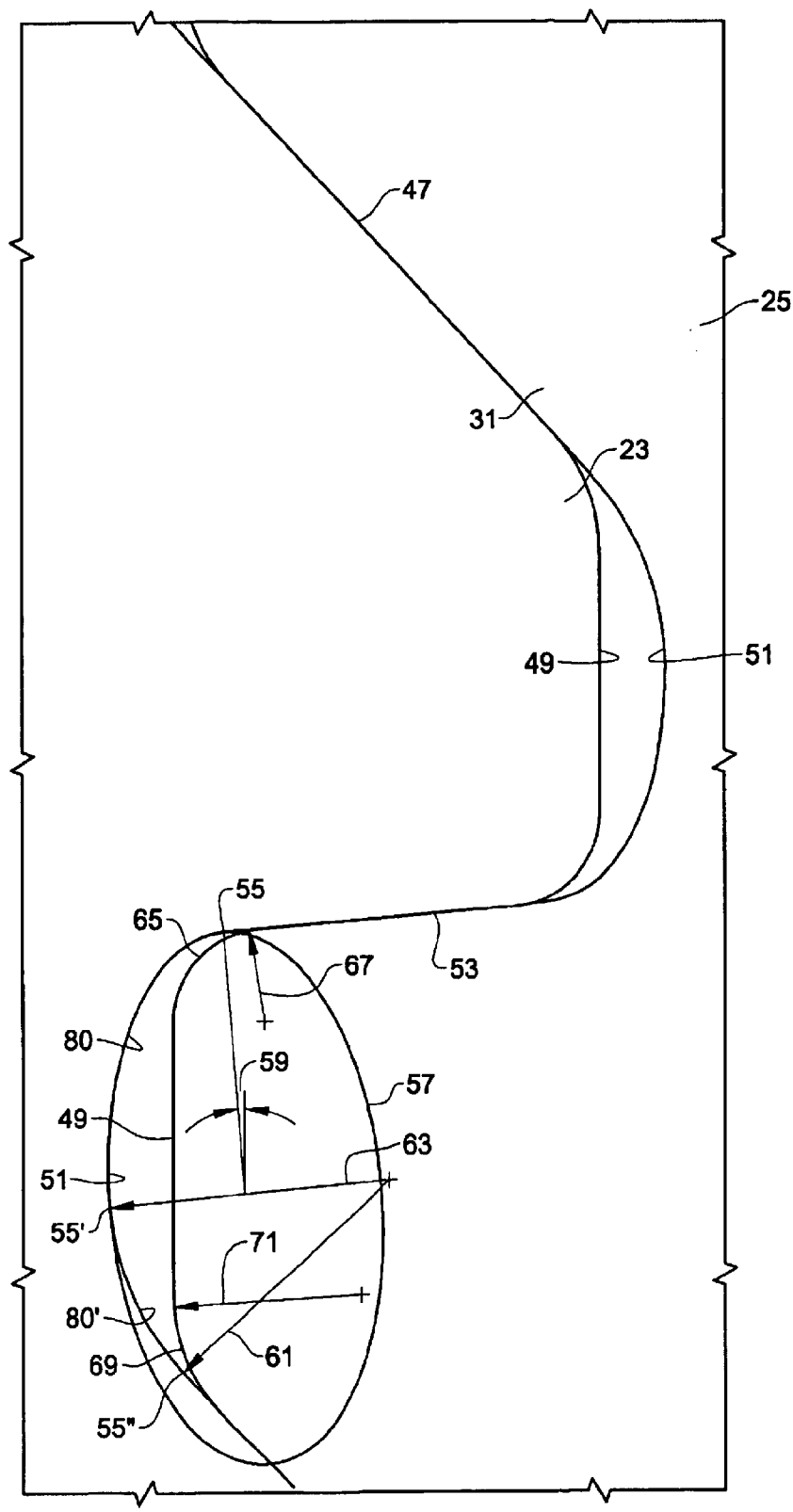
FIG. 3 is an enlarged partial sectional view of the made up connector of FIG. 1.

Referring to FIG. 3, an enlarged view of a portion of threads 23, 31 is shown. In FIG. 3, nose 17 (FIG. 1) is located above the portion of threads 23 shown and rim 35 (FIG. 1) is located below the portion of threads 31 shown. Each thread 23, 31 has a stabbing flank 47 that is preferably at a 45° angle relative to the axis. Each thread 23, 31 also has a crest 49 that is blunt and conical, concentric with the longitudinal axis. Crest 49 is formed at the same degree of taper of threads 23, 31, which in this embodiment is ¾ inches per foot on diameter (~1.8°). Crest 49 does not contact root 51 of the mating thread. A load flank 53 extends from crest 49 at a slight conical angle relative to a plane perpendicular to the axis. This angle is preferably 7° relative to a plane perpendicular to the axis. Threads 23, 31 have radial interference between the stabbing flanks 47 and load flanks 53 at makeup. The 7° taper of load flanks 53 is positive such that the outer portions of load flank 53 of threads 23 on pipe 11 are closer to nose 17 (FIG. 2b) than the inner periphery of each stabbing flank 53 of threads 23.

An ellipse 57 and radius 63 preferably forms root 51. Root 51 is comprised of an elliptical portion 80 of ellipse 57 and a circular portion 80' of radius 63. Junction 55 is between elliptical portion 80 and load flank 53. Junction 55' is between elliptical portion 80 and circular portion 80' of root 51. Junction 55" is between circular portion 80' and stabbing flank 47.

Ellipse 57 has a major axis that extends longitudinally and a minor axis that extends radially. The major axis is preferably tilted so that it is at an angle 59 relative to the longitudinal axis of pipe 11, but angle 59 is much less of an angle than the angle between its minor axis relative to the longitudinal axis of pipe 11. Angle 59 is preferably 7°. This results in a root 51 between stabbing flank 47 and load flank 53 which reduces the stress in the root area.

A junction 65 between crest 49 and load flank 53 is formed at a smaller radius 67. A junction 69 between crest 49 and stabbing flank 47 is formed at an intermediate radius 71 that is smaller than radius 63 but larger than radius 67. Threads 23 are machined on conventional pipe. Threads 31 are machined on the inside surface of a coupling sleeve.

In operation, pipe 11 stabs into coupling 25 and the members are rotated relative to each other. This causes threads 23 and 31 to make up. Nose 17 will form a seal against seal area 29. Seal surface 33 will form a seal against exterior surface 22 of seal/support ring 21.

The invention has significant advantages. The seal/support ring provides support and external sealing without reducing the thickness of the connector where it is located. This allows pin threads to be formed on non-upset pipe ends. The seal/support ring thus allows a threaded-and-coupled connection to utilize an external metal-to-metal seal and still have adequate strength in riser strings. The elliptical root portion reduces stresses in the roots of the threads. The seal/support ring allows an external seal to be of a different type of material than the pipe, thus reducing pipe stress levels in the transfer of bending loads from the pipe to the coupling.

While the invention has been shown in only one of its forms, it should be apparent to those skilled in the art that it is not so limited but is susceptible to various changes without departing from the scope of the invention. For example, although not shown on a welded-on connector, the rigid seal/support ring could be utilized on such to provide an external seal of a different material than the connector.

We claim:

1. A pipe connector, comprising:
   a pin having external threads;
   a box having internal threads that mate with the pin external threads;
   the pin having a nose located at an extreme end of the pin, the nose having a seal surface;
   the box having a second seal surface that engages the seal surface of the pin nose to form an internal seal;
   a rigid seal/support ring fixedly mounted on an exterior portion of the pin in an interference fit and farther from the nose of the pin than the threads; and
   a first seal surface in the box for sealingly mating with the rigid seal/support ring to provide bending support and form an external seal.

2. The connector according to claim 1, wherein the rigid seal/support ring is of a different material than the material of the pin.

3. The connector according to claim 1, wherein the rigid seal/support ring has a lower modulus of elasticity than the pin.

4. The connector according to claim 1, wherein the rigid seal/support ring has a conical exterior, and the first seal surface in the box is conical.

5. The connector according to claim 1, wherein the rigid seal/support ring has an inner diameter that is smaller than an outer diameter of the exterior portion of the pin prior to installation of the seal/support ring on the pin.

6. The connector according to claim 1, wherein each of the internal and external threads comprises:
   load flanks and stabbing flanks joined alternately by crests and roots, wherein the load flanks of the box and pin engage each other when the connector is fully made up;
   the load flanks being formed at a lesser angle than the stabbing flanks relative to a plane perpendicular to an axis of the connector; and
   the junction of each root with each load flank being formed by a portion of an ellipse that has a major axis that is at a smaller angle relative to the axis of the connector than a minor axis of the ellipse.

7. The connector according to claim 1, wherein the box has a reduced outer diameter portion located radially outward from the first seal surface of the box, the reduced outer diameter portion having an axial length greater than an axial length of the first seal surface of the box and an outer diameter that is less than the maximum outer diameter of the box.

8. A pipe connector, comprising:
   a pin having a nose and external threads extending in a first direction from the nose;
   a metallic seal/support ring rigidly mounted in an interference fit on an exterior portion of the pin, the external threads being located between the metallic seal/support ring and the nose, the metallic seal/support ring having a tapered exterior seal surface;
   the metallic seal/support ring having a lesser modulus of elasticity than the pin;
   a box having a rim and internal threads that mate with the external pin threads;
   a first seal surface in the box for engaging the seal surface of the metallic seal/support ring to form an external seal; and
   a second seal surface located farther from the rim than the first seal surface in the box for engaging the pin nose to form an internal seal.

9. The connector according to claim 8, further comprising:
   a tapered step formed on the pin adjacent to the metallic seal/support ring opposite the threads, the step gradually increasing in diameter from the metallic seal/support ring to an outer diameter larger than an inner diameter of the metallic seal/support ring to resist movement of the metallic seal/support ring in the first direction when the pin is screwed into the box.

10. The connector according to claim 8, wherein the metallic seal/support ring has an inner diameter prior to installation on the pin that is smaller than an outer diameter of the exterior portion of the pin.

11. The connector according to claim 8, wherein the box has a reduced outer diameter portion located radially outward from the first seal surface of the box, the reduced outer diameter portion having an axial length that is greater than an axial length of the first seal surface of the box and an outer diameter that is less than the maximum outer diameter of the box.

12. The connector according to claim 8, wherein each of the internal and external threads comprises:
   load flanks and stabbing flanks joined alternately by crests and roots, wherein the load flanks of the box and pin engage each other when the connector is fully made up;
   the load flanks being formed at a lesser angle than the stabbing flanks relative to a plane perpendicular to an axis of the connector; and
   the junction of each root with each load flank being formed by a portion of an ellipse that has a major axis that is at a smaller angle relative to the axis of the connector than a minor axis of the ellipse, the smaller angle of the major axis being an acute angle relative to the axis of the connector.

13. A pipe connector, comprising:
   a pin having a nose and external threads extending in a first direction from the nose;
   a metallic seal/support ring rigidly mounted on an exterior portion of the pin, the external threads being located between the metallic seal/support ring and the nose, the metallic seal/support ring having a tapered exterior seal surface;
   a box having a rim and internal threads that mate with the external pin threads;
   a first seal surface in the box for engaging the seal surface of the metallic seal/support ring to form an external seal;
   a second seal surface located farther from the rim than the first seal surface in the box for engaging the pin nose to form an internal seal; and
   a micro-knurled or roughened surface on the pin underlying the metallic seal/support ring to resist movement of the metallic seal/support ring.

14. A pipe connector, comprising:
   a pin having a nose and external threads extending in a first direction from the nose;
   a metallic seal/support ring rigidly mounted on an exterior portion of the pin, the external threads being located between the metallic seal/support ring and the nose, the metallic seal/support ring having a tapered exterior seal surface;

a box having a rim and internal threads that mate with the external pin threads;

a first seal surface in the box fir engaging the seal surface of the metallic seal/support ring to form an external seal;

a second seal surface located farther from the rim than the first seal surface in the box for engaging the pin nose to form an internal seal; and an adhesive inserted between the pin and the metallic seal/support ring to resist movement of the metallic seal/support ring.

15. A pipe connector, comprising:

a pin having a nose and external threads extending in a first direction from the nose;

a metallic seal/support ring rigidly mounted on an exterior portion of the pin, the external threads being located between the metallic seal/support ring and the nose, the metallic seal/support ring having a tapered exterior seal surface;

a box having a rim and internal threads that mate with the external pin threads;

a first seal surface in the box for engaging the seal surface of the metallic seal/support ring to form an external seal;

a second seal surface located farther from the rim than the first seal surface in the box for engaging the pin nose to form an internal seal; and a shot-peened region of the pin underlying the metallic seal/support ring to resist movement of the metallic seal/support ring and enhance the fatigue performance of the connection.

16. A pipe connector, comprising:

a nose formed on a forward end of a non-upset pipe, the nose having an external seal surface for sealing against a seal surface within a box;

external threads formed on the pipe and extending rearward from the nose at a conical taper; and a metallic seal/support ring mourned with an interference fit on an exterior portion of the pipe rearward of the external threads, the metallic seal/support ring having a tapered exterior seal surface for sealing against another seal surface within the box.

17. The pipe connector according to claim 16, further comprising:

a tapered step formed on the pipe rearward of the metallic seal/support ring, the step gradually increasing in diameter from the metallic seal/support ring to an outer diameter larger than an inner diameter of the metallic seal/support ring to resist rearward movement of the metallic seal/support ring.

18. A pipe connector, comprising:

a nose formed on a forward end of a non-upset pipe, the nose having an external seal surface for sealing against a seal surface within a box;

external threads formed on the pipe and extending rearward from the nose at a conical taper;

a metallic seal/support ring mounted with an interference fit on an exterior portion of the pipe rearward of the external threads, the metallic seal/support ring being of a lesser modulus of elasticity the pipe, the metallic seal/support ring having a tapered exterior seal surface for sealing against another seal surface within the box; and a tapered step formed on the pipe rearward of the metallic seal/support ring, the step gradually increasing in diameter from metallic seal/support ring in a rearward direction to an outer diameter larger than an inner diameter of the metallic seal/support ring to resist rearward movement of the metallic seal/support ring.

19. A tapered thread form for a pipe connector, comprising:

a load flank formed at first angle relative to a plane perpendicular to an axis of the connector;

a stabbing flank formed at a second and greater angle relative to a plane perpendicular to an axis of the connector;

a crest joining the load and stabbing flanks;

a root joining the load and stabbing flanks opposite the crest; and the root being formed by a elliptical portion of an elliptical surface and a circular portion of a circular surface, wherein the elliptical and circular surfaces join each other tangentially, and the elliptical portion of the root joins the load flank tangentially, and the circular portion of the root joins the stabbing flank tangentially.

20. The thread form according to claim 19, wherein the the elliptical surface has a major axis that is substantially normal to the load flank.

21. The thread form according to claim 19, wherein the elliptical surface has a major axis that is at an acute angle relative to the axis of the connector.

* * * * *